(12) United States Patent
Tee et al.

(10) Patent No.: US 9,658,760 B2
(45) Date of Patent: May 23, 2017

(54) METHODS FOR SEARCHING DIGITAL FILES ON A USER INTERFACE

(75) Inventors: Hock Guan Tee, Singapore (SG); Aik Tat Tan, Singapore (SG)

(73) Assignee: Creative Technology Ltd., Singapore (SG)

( * ) Notice: Subject to any disclaimer, the term of this patent is extended or adjusted under 35 U.S.C. 154(b) by 500 days.

(21) Appl. No.: 12/437,277

(22) Filed: May 7, 2009

(65) Prior Publication Data

US 2010/0287154 A1 Nov. 11, 2010

(51) Int. Cl.
*G06F 3/0488* (2013.01)
*G06F 3/0485* (2013.01)

(52) U.S. Cl.
CPC ........ *G06F 3/0488* (2013.01); *G06F 3/04855* (2013.01)

(58) Field of Classification Search
CPC ... G06F 3/04855; G06F 3/0485; G06F 3/0488
USPC .......................................... 715/784, 785–787
See application file for complete search history.

(56) References Cited

U.S. PATENT DOCUMENTS

| | | | | |
|---|---|---|---|---|
| 5,371,846 A * | 12/1994 | Bates | ............................. | 715/786 |
| 5,739,817 A * | 4/1998 | Glei et al. | ...................... | 715/787 |
| 5,757,370 A * | 5/1998 | Amro et al. | ................... | 715/787 |
| 6,219,052 B1 * | 4/2001 | Gould | ............................ | 345/661 |
| 6,486,896 B1 * | 11/2002 | Ubillos | ......................... | 715/784 |
| 6,597,378 B1 * | 7/2003 | Shiraishi et al. | ............. | 715/764 |
| 6,809,724 B1 * | 10/2004 | Shiraishi et al. | ............. | 345/169 |
| 6,816,174 B2 * | 11/2004 | Tiongson et al. | ............ | 715/787 |
| 6,828,989 B2 * | 12/2004 | Cortright | ...................... | 715/769 |
| 7,159,188 B2 * | 1/2007 | Stabb et al. | ................... | 715/787 |
| 7,165,227 B2 * | 1/2007 | Ubillos | ......................... | 715/784 |
| 7,328,411 B2 * | 2/2008 | Satanek | ........................ | 715/786 |
| 7,428,709 B2 * | 9/2008 | Forstall et al. | ................ | 715/784 |
| 7,523,412 B2 * | 4/2009 | Jones et al. | .................... | 715/787 |
| 7,676,759 B2 * | 3/2010 | Carter | ............................ | 715/783 |
| 2002/0063737 A1 * | 5/2002 | Feig et al. | ..................... | 345/786 |
| 2002/0109728 A1 * | 8/2002 | Tiongson et al. | ............. | 345/786 |
| 2002/0186252 A1 * | 12/2002 | Himmel et al. | ............... | 345/787 |
| 2002/0191029 A1 * | 12/2002 | Gillespie et al. | ............. | 345/810 |
| 2003/0018427 A1 * | 1/2003 | Yokota et al. | ................. | 701/208 |
| 2004/0085364 A1 * | 5/2004 | Keely et al. | ................... | 345/804 |
| 2005/0138565 A1 * | 6/2005 | Jaeger | ............................ | 715/747 |
| 2005/0210403 A1 * | 9/2005 | Satanek | ........................ | 715/786 |
| 2006/0136838 A1 * | 6/2006 | Nurmi | ........................... | 715/786 |
| 2006/0161846 A1 * | 7/2006 | Van Leeuwen | ............... | 715/702 |
| 2006/0161871 A1 * | 7/2006 | Hotelling et al. | ............ | 715/863 |
| 2006/0184901 A1 * | 8/2006 | Dietz | ............................. | 715/855 |
| 2006/0236261 A1 * | 10/2006 | Forstall et al. | ............... | 715/784 |
| 2007/0132789 A1 * | 6/2007 | Ording et al. | ................ | 345/684 |
| 2007/0143705 A1 * | 6/2007 | Peters | ........................... | 715/786 |
| 2007/0146337 A1 * | 6/2007 | Ording et al. | ................ | 345/173 |
| 2007/0150830 A1 * | 6/2007 | Ording et al. | ................ | 715/784 |

(Continued)

*Primary Examiner* — Omar Abdul-Ali
*Assistant Examiner* — Phoebe Pan
(74) *Attorney, Agent, or Firm* — Russell Swerdon; Desmond Gean

(57) ABSTRACT

There are provided methods for searching at least one desired digital file on a user interface. The user interface may include a first section showing a first sorted listing of digital files and a second section showing a second sorted listing of groupings by which the digital files in the first sorted listing are grouped. The user interface may be on either a touchscreen display or a non touch-screen display.

9 Claims, 4 Drawing Sheets

(56) References Cited

U.S. PATENT DOCUMENTS

| | | | |
|---|---|---|---|
| 2007/0192729 A1* | 8/2007 | Downs | 715/786 |
| 2007/0236475 A1* | 10/2007 | Wherry | 345/173 |
| 2008/0141165 A1* | 6/2008 | Feig et al. | 715/786 |
| 2008/0165150 A1* | 7/2008 | Kwon | 345/173 |
| 2008/0168478 A1* | 7/2008 | Platzer et al. | 719/328 |
| 2008/0174570 A1* | 7/2008 | Jobs et al. | 345/173 |
| 2008/0178116 A1* | 7/2008 | Kim | 715/786 |
| 2008/0235617 A1* | 9/2008 | Kim et al. | 715/786 |
| 2009/0049400 A1* | 2/2009 | Ishihara et al. | 715/785 |
| 2009/0075694 A1* | 3/2009 | Kim et al. | 455/556.1 |
| 2009/0077464 A1* | 3/2009 | Goldsmith et al. | 715/257 |
| 2009/0207139 A1* | 8/2009 | Kraft | 345/173 |
| 2009/0251422 A1* | 10/2009 | Wu | G06F 3/04886 345/173 |
| 2010/0008031 A1* | 1/2010 | Reifman et al. | 361/679.3 |
| 2010/0077343 A1* | 3/2010 | Uhl et al. | 715/787 |
| 2010/0234077 A1* | 9/2010 | Yoo et al. | 455/566 |
| 2010/0251114 A1* | 9/2010 | Wehba et al. | 715/702 |
| 2010/0251165 A1* | 9/2010 | Williams | 715/784 |
| 2011/0022985 A1* | 1/2011 | Ording et al. | 715/830 |
| 2011/0025649 A1* | 2/2011 | Sheikhzadeh Nadjar et al. | 345/177 |

\* cited by examiner

METHODS FOR SEARCHING DIGITAL FILES ON A USER INTERFACE

FIELD OF INVENTION

The present invention relates to the field of accessing content on a user interface, particularly, to methods for searching digital files on a user interface.

BACKGROUND

Digital files are becoming a widely accepted format for distributing entertainment content because of both ease of distribution and ease of replication. The entertainment content may include, for example, digital photographs, music files, video files and the like. In this regard, it is becoming increasingly common to access a voluminous number of digital files on either a handheld electronic device or a PC in order to consume the entertainment content. As the number of digital files increases, a need arises for a method to effectively search and access the voluminous number of digital files for a particular item.

Some methods and user interfaces have already been proposed in a variety of handheld electronic devices and PCs. However, it is not unusual for the aforementioned methods and user interfaces to give rise to incorrect selections and correspondingly, frustration on the part of the user. A common problem pertains to how use of a digital icon, a finger or a stylus pointer on a user interface results in obscuring a view of certain portions of the user interface, which correspondingly leads to the incorrect selections as mentioned earlier. Thus, there is a need for a method which provides quicker, easier and more accurate searching for a particular digital file by a user.

SUMMARY

There is provided a first method for searching at least one desired digital file on a user interface. The user interface may include a first section showing a first sorted listing of digital files and a second section showing a second sorted listing of groupings by which the digital files in the first sorted listing are grouped. The user interface may be on either a touch-screen display or a non touch-screen display.

The first method includes placing a selector beyond a pre-determined period of time (of at least one second) at a first position at the second sorted listing of groupings in the second section, the selector obscuring a portion of the user interface; showing a representation of a grouping obscured by the selector that is placed at the second sorted listing of groupings in the second section; minimizing a rate of scrolling of the second sorted listing of groupings in the second section when the selector is moved along the second sorted listing of groupings in the second section from the first position to a second position; and showing at least a third sorted listing of digital files in the first section, the third sorted listing of digital files belonging to the grouping shown in the representation. Minimizing the rate of scrolling may advantageously cause an appearance of the second sorted listing of groupings in the second section to be enlarged. It is preferable that the minimization of the rate of scrolling of the second sorted listing of groupings in the second section is due to enlargement of image pixels in the second section.

Preferably, both the representation and the at least a third sorted listing are continually updated as the selector is moved along the second sorted listing of the groupings in the second section. The representation of the grouping may be located in any portion of the user interface and may preferably be enlarged in relation to an appearance of the second sorted listing of groupings in the second section.

The first method may further include moving the selector to the first section showing the at least a third sorted listing of digital files to select the at least one desired digital file. The selector may be either a stylus tip or a finger tip. Alternatively, the selector may be a digital icon controllable by an input device such as, for example, a computer mouse, a motion sensing controller, a joystick, directional control keys on a keyboard, a track ball, any combination of the aforementioned and so forth.

The second sorted listing of groupings may scroll in a first direction when the selector is positioned at a first end of the second sorted listing and the second sorted listing of groupings may scroll in a second direction when the selector is positioned at a second end of the second sorted listing.

There is also provided a second method for searching at least one desired digital file on a user interface. The user interface includes a first section showing a first sorted listing of digital files and a second section showing a second sorted listing of groupings by which the digital files in the first sorted listing are grouped. The user interface may be on either a touch-screen display or a non touch-screen display.

The second method includes placing a selector beyond a pre-determined period of time (of at least one second) at a first position at the second sorted listing of groupings in the second section, the selector obscuring a portion of the user interface; showing a representation of a grouping obscured by the selector that is placed at the second sorted listing of groupings in the second section, the representation of the grouping being a fourth sorted listing of groupings including at least one grouping both before and after the grouping obscured by the selector, with the grouping obscured by the selector being centralized in the fourth sorted listing; and showing at least a third sorted listing of digital files in the first section, the third sorted listing of digital files belonging to the centralized grouping shown in the representation. The grouping obscured by the selector may be highlighted within the fourth sorted listing, where the highlighting uses forms such as, for example, enclosing within a boundary, varying font colour, varying font, bolding font, italicizing font and so forth It is preferable that both the representation and the at least a third sorted listing are continually updated as the selector is moved along the second sorted listing of the groupings in the second section. The representation of the grouping may be enlarged in relation to an appearance of the second sorted listing of groupings in the second section and may be located in any portion of the user interface.

The second method may further include moving the selector to the first section showing the at least a third sorted listing of digital files to select the at least one desired digital file. The selector may be either a stylus tip or a finger tip. Alternatively, the selector may be a digital icon controllable by an input device such as, for example, a computer mouse, a motion sensing controller, a joystick, directional control keys on a keyboard, a track ball, any combination of the aforementioned and so forth.

It is preferable that the second sorted listing of groupings scrolls in a first direction when the selector is positioned at a first end of the second sorted listing and the second sorted listing of groupings scrolls in a second direction when the selector is positioned at a second end of the second sorted listing.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
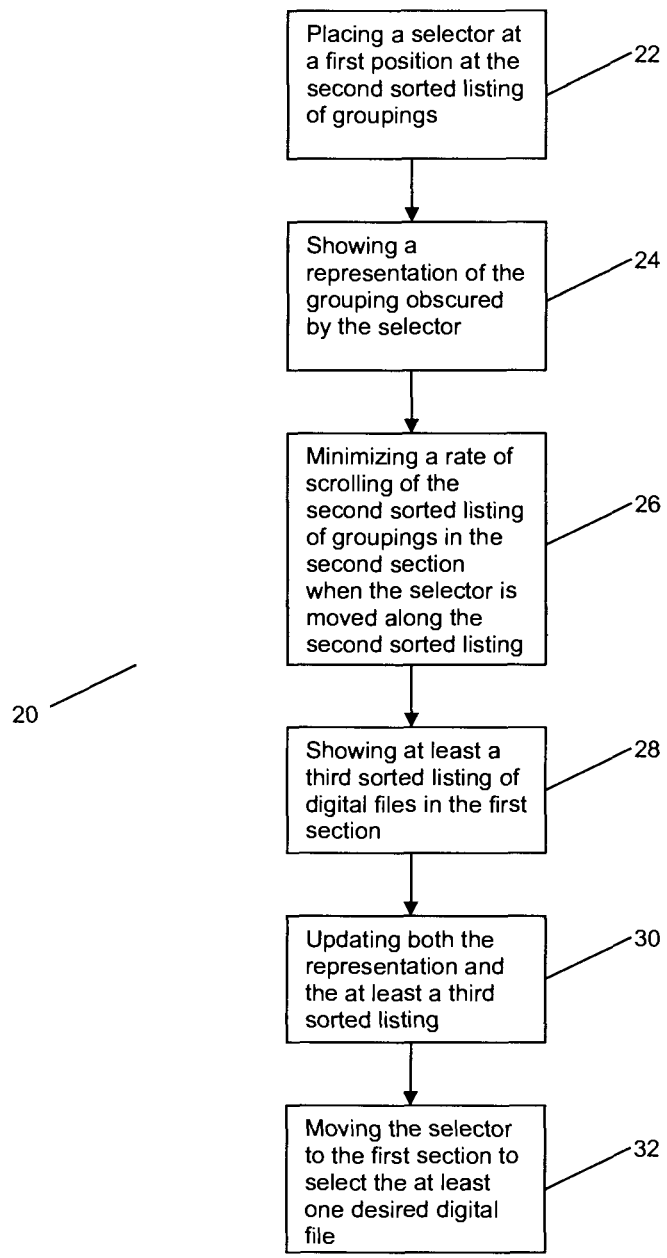
FIG. 1 shows a process flow for a first method of the present invention.
Figure 2:
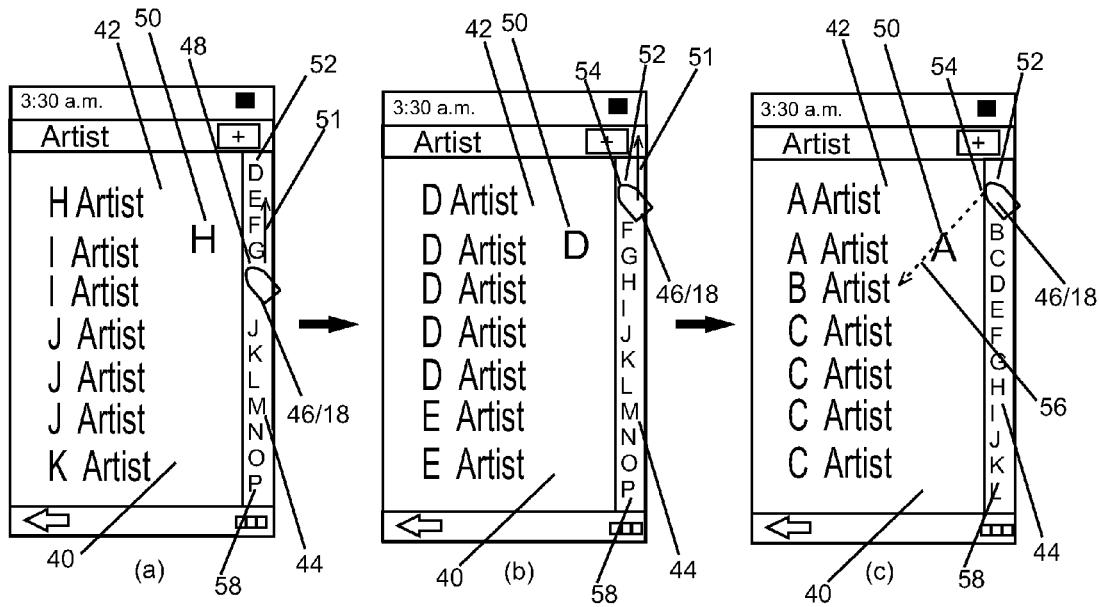
FIG. 2 shows a first application of the first method of the present invention.
Figure 3:
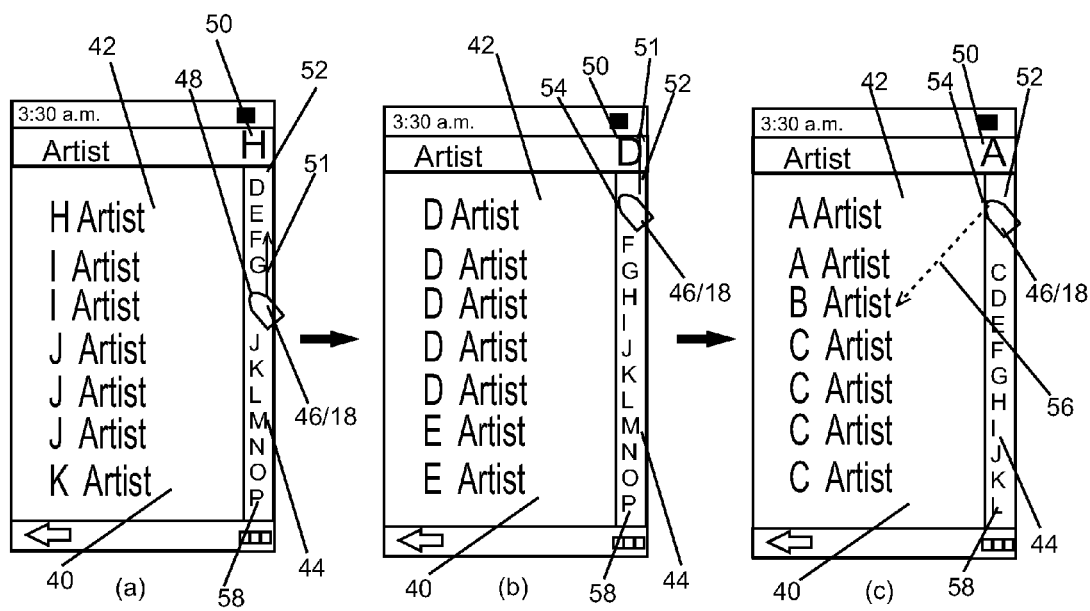
FIG. 3 shows a second application of the first method of the present invention.

Referring to FIGS. 1-3, there is shown a first method 20 for searching at least one desired digital file on a user interface 40 (in FIGS. 2 and 3). FIGS. 2 and 3 show a first and second application of the first method 20 respectively. The user interface 40 may be found on a screen/display of either a handheld digital device or a PC. It is preferable, but not mandatory that the screen/display is a touch-sensitive screen. It should be noted that the digital file may include, for example, digital photographs, music files, video files, digital folders containing digital files and the like. The user interface 40 may include a first section 42 showing a first sorted listing of digital files and a second section 44 showing a second sorted listing of groupings by which the digital files in the first sorted listing are grouped. In a non-limiting illustration as shown in both FIGS. 2 and 3, the first sorted listing shows a listing of artistes while the second sorted listing shows a sequential listing of alphabets. It should be understood that both FIGS. 2 and 3 are presented sequentially, where FIG. 2(a) leads to FIG. 2(b) which leads to FIG. 2(c) and so forth.

While the second section 44 is shown to be located along a right edge of the user interface 40, it should be noted that the second section 44 may be located along any edge of the user interface 40. The description of the first method 20 in the subsequent paragraphs will illustrate how the second sorted listing is used to search for a particular artiste in the first sorted listing in a quick, easy and accurate manner. It should be noted that searching for a particular artiste is merely illustrative, and that searching may be done for items in accordance to categories such as, for example, albums, genre, date, location, event, and so forth.

The first method 20 includes placing a selector 46 beyond a pre-determined period of time at a first position 48 at the second sorted listing of groupings in the second section 44 (22). It should be noted that each grouping is a collation of files with at least one common parameter. In this instance shown in both FIGS. 2 and 3, the grouping has a common parameter of "starting alphabet" of artiste name, where the artistes in each grouping has an identical "starting alphabet". The pre-determined period of time may be at least one second. Referring to both FIGS. 2 and 3, it should be noted that the selector 46 obscures a portion of the user interface 40, namely at the second section 44 where the selector 46 is placed. The selector 46 may be either a stylus tip or a finger tip (as shown in both FIGS. 2 and 3) when the selector 46 is in physical contact with the user interface 40. When the selector 46 is in physical contact with the user interface 40, the user would be able to invoke selection on the user interface 40 by physically tapping on the user interface 40 with the selector 46.

It should be appreciated that in certain circumstances, a digital icon 18 in the user interface 40 may also obscure the portion of the user interface 40. The digital icon 18 may be in a form of a pointer in the user interface 40, where the digital icon may be controllable by an input device such as, for example, a computer mouse, a motion sensing controller, a joystick, directional control keys on a keyboard, a track ball, any combination of the aforementioned and the like. This is because having a screen/display which is a touch-sensitive screen does not necessarily rule out use of other input devices. In this regard, the digital icon 18 may be of any size and shape at a preference of the user without regard to whether or not the digital icon 18 obscures the portion of the user interface 40 where the digital icon 18 is positioned. In these circumstances, the user would be able to invoke selection on the user interface 40 via the input device. For the sake of illustration, the digital icon 18 is also shown in both FIGS. 2 and 3, where the digital icon 18 is in a form of a finger tip.

The method 20 also includes showing a representation 50 of a grouping from the second section 44 which is obscured by the selector 46 that is placed at the second sorted listing of groupings in the second section 44 (24). Referring to both FIGS. 2 and 3, the representation 50 is enlarged in relation to an appearance of the second sorted listing of groupings in the second section 44. The representation 50 may be located in any portion of the user interface 40. In FIG. 2, the representation 50 is located adjacent to the second section 44 of the user interface 40. In FIG. 3, the representation 50 is located at a first end 52 of the second section 44. It should be appreciated that the representation 50 may be located anywhere in the user interface 40 as long as the representation 50 is viewable by a user of the user interface 40.

Figure 6:
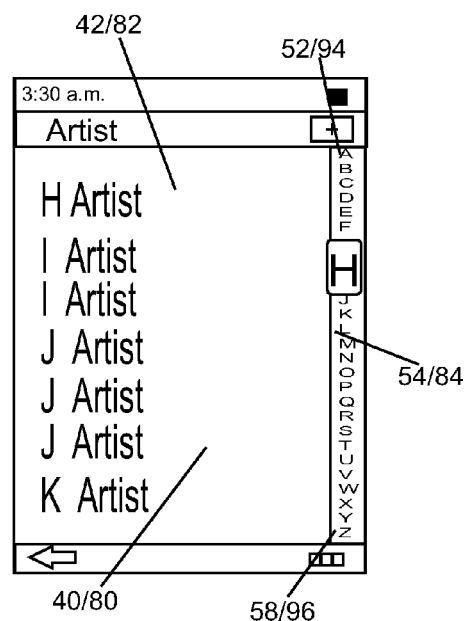
FIG. 6 shows a sample appearance of a user interface prior to contact of a selector.

Subsequently, the method 20 includes minimizing a rate of scrolling of the second sorted listing of groupings in the second section 44 when the selector 46 is moved along the second sorted listing of groupings in the second section 44 from the first position 48 to a second position 54 (26) as shown in FIGS. 2(a) to 2(b) and FIGS. 3(a) to 3(b). A first arrow 51 denotes a direction of movement of the selector 46. It should also be noted from both FIGS. 2 and 3 that there is an enlargement of the appearance of the second sorted listing of groupings in the second section 44. This enlargement of the second section is evident compared to the user interface 40 prior to positioning of the selector 46 on the user interface 40 as shown in FIG. 6, as FIG. 6 shows an instance of the user interface 40 before the positioning of the selector 46 on the user interface 40. The enlargement of the appearance of the second sorted listing of groupings in the second section 44 is due to an enlargement of image pixels in the second section 44. The enlargement of image pixels in the second section 44 correspondingly minimizes the rate of scrolling of the second section 44.

In addition, the method 20 includes showing at least a third sorted listing of digital files in the first section 42, the third sorted listing of digital files belonging to the grouping shown in the representation 50. It should be noted that digital files which do not belong to the grouping may also be shown in the first section 42 as shown in both FIGS. 2 and 3. Referring to both FIGS. 2(b) and 3(b), it should be noted that artistes with names starting with "D" are shown in the first section 42, where the artistes with names starting with "D" were not initially listed in the first section 42 as shown in both FIGS. 2(a) and 3(a).

It is evident from both FIGS. 2 and 3 that both the representation 50 and the at least a third sorted listing in the first section 42 are continually updated as the selector 46 is moved along the second sorted listing of the groupings in the second section 44 (30). The continual updating of both the representation 50 and the at least a third sorted listing in the first section 42 enables the user of the interface 40 to constantly oversee a scrolling of the first sorted listing of digital files in the first section 42 by navigating using the second section 44 showing a second sorted listing of groupings by which the digital files in the first sorted listing are grouped.

Referring to FIGS. 2(b) to 2(c) and FIGS. 3(b) to 3(c), the second sorted listing of groupings scrolls in a first direction when the selector 46 is positioned at the first end 52 of the second sorted listing (the second sorted listing is shown to scroll from "D" to "A"). Similarly, the second sorted listing of groupings scrolls in a second direction when the selector 46 is positioned at a second end 58 of the second sorted listing (for example, from "F" to "K" although this is not shown).

Finally, the method 20 also further includes moving the selector 46 to the first section 42 showing the at least a third sorted listing of digital files to select the at least one desired digital file (32). Both FIGS. 2(c) and 3(c) show the moving of the selector 46 to the first section 42 via the path shown by a dotted arrow 56. It should be noted that the selector 46 need not be in constant contact along the path shown by the dotted arrow 56 with the user interface 40 when moving to the first section 42.

Figure 4:
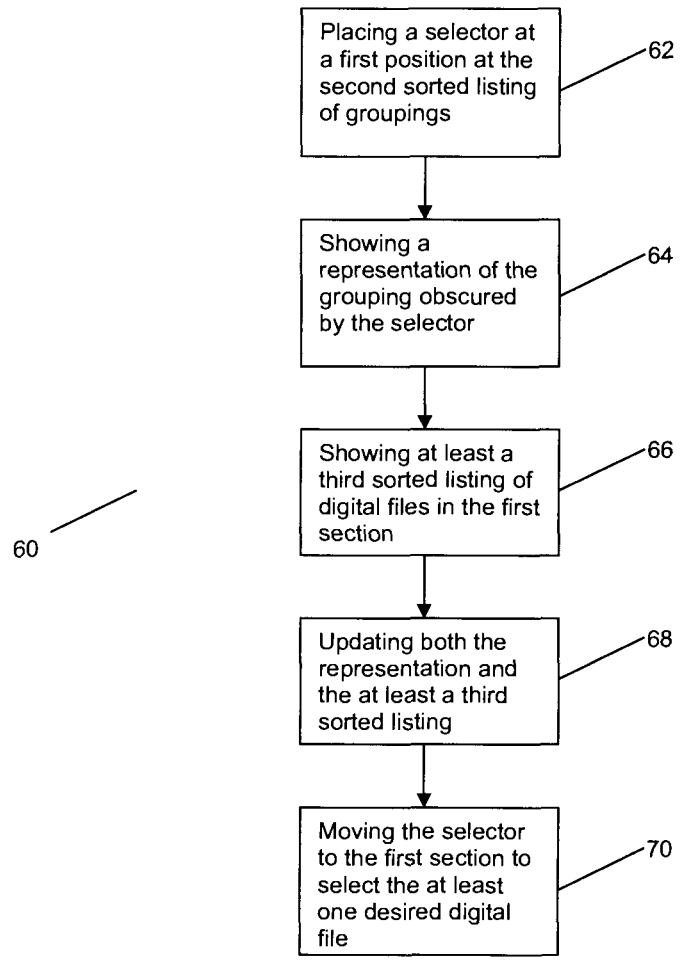
FIG. 4 shows a process flow for a second method of the present invention.
Figure 5:
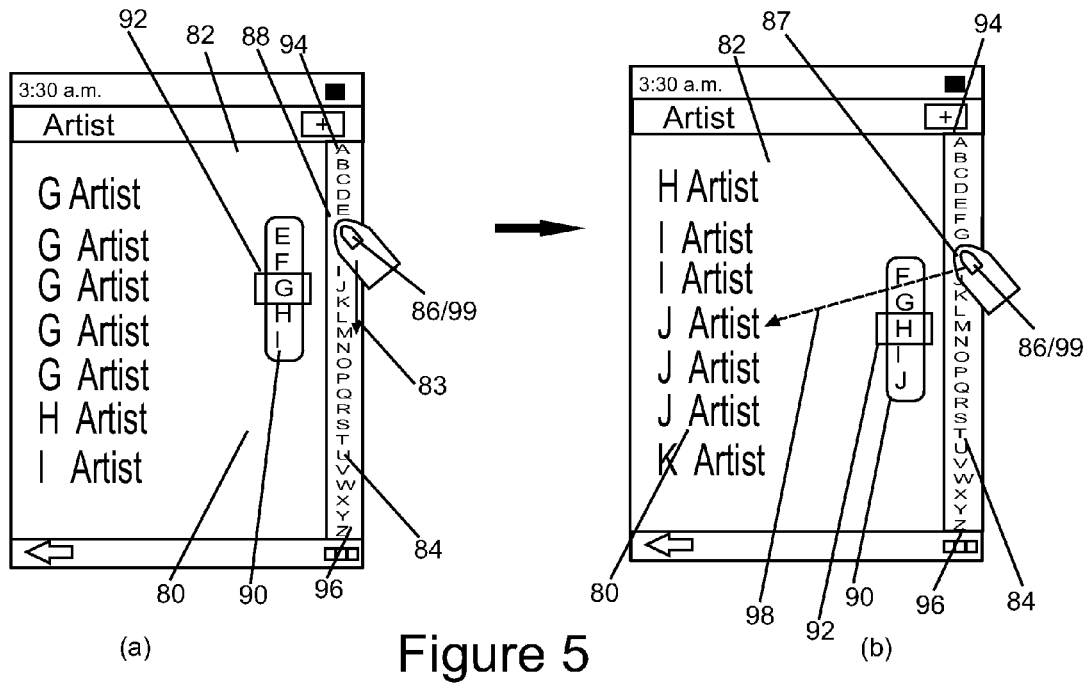
FIG. 5 shows a first application of the second method of the present invention.

Referring to both FIGS. 4 and 5, there is shown a second method 60 for searching at least one desired digital file on a user interface 80 (in FIG. 5). FIG. 5 shows a first application of the second method 60. The user interface 80 may be found on a screen/display of either a handheld digital device or a PC. It is preferable but not mandatory that the screen/display is a touch-sensitive screen. It should be noted that the digital file may include, for example, digital photographs, music files, video files, digital folders containing digital files and the like. The user interface 80 may include a first section 82 showing a first sorted listing of digital files and a second section 84 showing a second sorted listing of groupings by which the digital files in the first sorted listing are grouped. In a non-limiting illustration as shown in FIG. 5, the first sorted listing shows a listing of artistes while the second sorted listing shows a sequential listing of alphabets. It should be understood that FIG. 5 is presented sequentially, where FIG. 5(a) leads to FIG. 5(b).

While the second section 84 is shown to be located along a right edge of the user interface 80, it should be noted that the second section 84 may be located along any edge of the user interface 80. The description of the second method 60 in the subsequent paragraphs will illustrate how the second sorted listing is used to search for a particular artiste in the first sorted listing in a quick, easy and accurate manner. It should be noted that searching for a particular artiste is merely illustrative, and that searching may be done for items in accordance to categories such as, for example, albums, genre, date, location, event, and so forth.

The second method 60 includes placing a selector 86 beyond a pre-determined period of time at a first position 88 at the second sorted listing of groupings in the second section 84 (62). It should be noted that each grouping is a collation of files with at least one common parameter. In this instance shown in FIG. 5, the grouping has a common parameter of "starting alphabet" of artiste name, where the artistes in each grouping has an identical "starting alphabet". The pre-determined period of time may be at least one second. Referring to FIG. 5, it should be noted that the selector 86 obscures a portion of the user interface 80, namely at the second section 84 where the selector 86 is placed. The selector 86 may be either a stylus tip or a finger tip (as shown in FIG. 5) when the selector 86 is in physical contact with the user interface 80. When the selector 86 is in physical contact with the user interface 80, the user would be able to invoke selection on the user interface 80 by physically tapping on the user interface 80 with the selector 86.

It should be appreciated that in certain circumstances, a digital icon 99 in the user interface 80 may also obscure the portion of the user interface 80. The digital icon 99 may be in a form of a pointer in the user interface 80, where the digital icon 99 may be controllable by an input device such as, for example, a computer mouse, a motion sensing controller, a joystick, directional control keys on a keyboard, a track ball, any combination of the aforementioned, and the like. This is because having a screen/display which is a touch-sensitive screen does not necessarily rule out use of other input devices. In this regard, the digital icon 99 may be of any size and shape at a preference of the user without regard to whether or not the digital icon 99 obscures the portion of the user interface 80 where the digital icon 99 is positioned. In these circumstances, the user would be able to invoke selection on the user interface 80 via the input device. For the sake of illustration, the digital icon 99 is also shown in FIG. 5, where the digital icon 99 is in a form of a finger tip.

The method 60 also includes showing a representation 90 of a grouping from the second section 84 which is obscured by the selector 86 that is placed at the second sorted listing of groupings in the second section 84 (64). This representation 90 is evident compared to the user interface 80 prior to positioning of the selector 86 on the user interface 80 as shown in FIG. 6, as FIG. 6 shows an instance of the user interface 80 before the positioning of the selector 86 on the user interface 80. The representation 90 is a fourth sorted listing of groupings including at least one grouping both before and after the grouping obscured by the selector 86. Referring to FIG. 5, the representation 90 is a sorted listing of groupings with two groupings before and two groupings after the grouping obscured by the selector 86. Using FIG. 5(a) for illustration, the grouping obscured by the selector 86 is "G", with the two groupings before being "E" and "F" and the two groupings after being "H" and "I".

The representation 90 is also enlarged in relation to an appearance of the second sorted listing of groupings in the second section 84. The representation 90 may be located in any portion of the user interface 80. In FIG. 5, the representation 90 is located adjacent to the second section 84 of the user interface 80. It should be appreciated that the representation 90 may be located anywhere in the user interface 80 as long as the representation 90 is viewable by a user of the user interface 80. The grouping obscured by the selector 86 may be centralized within the fourth sorted listing of the representation 90. In addition, the grouping obscured by the selector 86 may be highlighted 92 within the fourth sorted listing of the representation 90.

While the highlighting 92 of the grouping obscured by the selector 86 is shown to be in a form of enclosing the grouping obscured by the selector 86 within a boundary, it should be noted that highlighting 92 of the grouping may be done by varying visual appearances using, for example, colours, fonts, bolding, italics and so forth.

In addition, the method 60 includes showing at least a third sorted listing of digital files in the first section 82, the third sorted listing of digital files belonging to the centralized grouping shown in the representation 90. Referring to FIG. 5(b), it should be noted that artistes with names starting with "H" are shown in the first section 82, where the artistes with names starting with "H" were not initially listed in the first section 82 as shown in FIG. 5(a).

It is evident from FIG. 5 that both the representation 90 and the at least a third sorted listing in the first section 82 are continually updated as the selector 86 is moved along the second sorted listing of the groupings in the second section 84 (68). The continual updating of both the representation 90 and the at least a third sorted listing in the first section 82 enables the user of the interface 80 to constantly oversee a scrolling of the first sorted listing of digital files in the first section 82 by navigating using the second section 84 showing a second sorted listing of groupings by which the digital files in the first sorted listing are grouped. FIG. 5 shows the selector 86 moving from a first position 88 to a second position 87 in a direction of a second arrow 83. It should be appreciated that the representation 90 may appear in either a transient or permanent manner. When the representation 90 appears in a transient manner, a duration which the representation 90 appears should be long enough for the user of the user interface 80 to identify the centralized grouping shown in the representation 90.

Referring to FIG. 5, the second sorted listing of groupings scrolls in a first direction when the selector 86 is positioned at a first end 94 of the second sorted listing. Similarly, the second sorted listing of groupings scrolls in a second direction when the selector 86 is positioned at a second end 96 of the second sorted listing. This behaviour is not shown in FIG. 5, but is similar to what is shown in both FIGS. 2(c) and 3(c).

Finally, the method 60 also further includes moving the selector 86 to the first section 82 showing the at least a third sorted listing of digital files to select the at least one desired digital file (70). FIG. 5(b) shows the moving of the selector 86 to the first section via the path shown by a dotted arrow 98. It should be noted that the selector 86 need not be in constant contact with the user interface 80 along the path shown by the dotted arrow 98 when moving to the first section 82.

Whilst there has been described in the foregoing description preferred embodiments of the present invention, it will be understood by those skilled in the technology concerned that many variations or modifications in details of design or construction may be made without departing from the present invention.

What is claimed is:

1. A method for searching at least one desired digital file on a user interface with the user interface including a first section showing a first sorted listing of digital files and a second section showing a second sorted listing of groupings by which the digital files in the first sorted listing are grouped, the method including:

positioning a selector on the user interface beyond a pre-determined period of time at a first position at the second sorted listing of groupings in the second section to show:
    a representation that includes a grouping from the second sorted listing of groupings in the second section which is obscured by the selector and both groupings before and after the grouping that is obscured by the selector; and
    a third sorted listing of digital files belonging to at least one of the groupings included in the representation;
enlarging appearance of the second sorted listing of groupings in the second section, appearance of the second sorted listing of groupings in the second section being enlarged relative to appearance of the second sorted listing of groupings prior to the selector being positioned on the user interface, wherein the enlarging includes displaying at least a subset of the second sorted listing of groupings prior to the selector being positioned on the user interface; and
scrolling the second sorted listing of groupings in a first direction when the selector is positioned at a first end of the second sorted listing and scrolling the second sorted listing of groupings in a second direction when the selector is positioned at a second end of the second sorted listing,
wherein the representation has an appearance which is enlarged relative to the enlarged appearance of the second sorted listing of groupings in the second section, and
wherein both the representation and the third sorted listing of digital files are continually updated as the selector is moved along the second sorted listing of groupings in the second section.

2. The method of claim 1, wherein the selector is either a stylus tip or a finger tip.

3. The method of claim 1, further including:
minimizing a rate of scrolling of the second sorted listing of groupings in the second section when the selector is moved along the second sorted listing of groupings in the second section from the first position to a second position.

4. The method of claim 3, wherein the minimization of the rate of scrolling of the second sorted listing of groupings in the second section is due to enlargement of image pixels in the second section.

5. The method of claim 1, wherein the pre-determined period of time is at least one second.

6. The method of claim 1, wherein the selector is a digital icon controllable by an input device, with the input device being selected from the group consisting of: a computer mouse, a motion sensing controller, a joystick, directional control keys on a keyboard, a track ball, and any combination of the aforementioned.

7. The method of claim 1, wherein the representation is located in any portion of the user interface.

8. The method of claim 1, wherein the user interface is on either a touch-screen display or a non touch-screen display.

9. The method of claim 1, further including:
moving the selector to the third sorted listing of digital files to select the at least one desired digital file.

* * * * *